United States Patent
Lee et al.

(10) Patent No.: US 11,968,990 B2
(45) Date of Patent: Apr. 30, 2024

(54) CREAMER COMPRISING VEGETABLE LIPIDS AND ALLULOSE

(71) Applicants: CJ CHEILJEDANG CORPORATION, Seoul (KR); KYUNGPOOK NATIONAL UNIVERSITY INDUSTRY-ACADEMIC COOPERATION FOUNDATION, Daegu (KR)

(72) Inventors: Young Mi Lee, Suwon-si (KR); Seong Bo Kim, Seongnam-si (KR); Yang Hee Kim, Suwon-si (KR); Seong Jun Cho, Seoul (KR); Myung Sook Choi, Daegu (KR); Young Ji Han, Daegu (KR); Ji Young Choi, Daegu (KR); Su Jung Cho, Daegu (KR); Un Ju Jung, Busan (KR); Eun Young Kwon, Goyang-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 17/653,992

(22) Filed: Mar. 8, 2022

(65) Prior Publication Data

US 2022/0192216 A1    Jun. 23, 2022

Related U.S. Application Data

(60) Division of application No. 16/435,939, filed on Jun. 10, 2019, now abandoned, which is a (Continued)

(30) Foreign Application Priority Data

Dec. 26, 2016 (KR) ........................ 10-2016-0179488

(51) Int. Cl.
    *A23C 11/02* (2006.01)
(52) U.S. Cl.
    CPC .......... *A23C 11/02* (2013.01); *A23C 2260/20* (2013.01); *A23V 2002/00* (2013.01); (Continued)
(58) Field of Classification Search
    CPC . A23C 11/02; A23C 2260/20; A23V 2002/00; A23V 2250/1618; A23V 250/18; A23V 2250/54246; A23V 2250/616
    See application file for complete search history.

(56) References Cited

U.S. PATENT DOCUMENTS

2009/0304891 A1    12/2009   Fujihara
2013/0029028 A1    1/2013    Kierbye
(Continued)

FOREIGN PATENT DOCUMENTS

CN    101919455 A    12/2010
JP    2013-532984 A    8/2013
(Continued)

OTHER PUBLICATIONS

Nagata et al., "D-Psicose, and Emimer of D-Fructose, Favorably Alters Lipid Metabolism in Sprague-Dawley Rats". Journal of Agricultural and Food Chemistry. 2015, 63, 3168-3176. (Year: 2015).*

(Continued)

*Primary Examiner* — Nikki H. Dees
*Assistant Examiner* — Assaf Zilbering
(74) *Attorney, Agent, or Firm* — Renner, Otto, Boisselle & Sklar

(57) ABSTRACT

The present application relates to creamer comprising vegetable lipids, casein, maltose, phosphates, and allulose.

6 Claims, 2 Drawing Sheets

Related U.S. Application Data continuation-in-part of application No. PCT/KR2017/015495, filed on Dec. 26, 2017.

(52) U.S. Cl.
CPC ... *A23V 2250/1618* (2013.01); *A23V 2250/18* (2013.01); *A23V 2250/54246* (2013.01); *A23V 2250/616* (2013.01)

(56) References Cited

U.S. PATENT DOCUMENTS

| | | | |
|---|---|---|---|
| 2013/0122178 A1 | 5/2013 | Sher | |
| 2014/0205731 A1* | 7/2014 | Kloek | A23L 23/10 426/589 |
| 2015/0056360 A1 | 2/2015 | Beeson | |
| 2016/0151305 A1 | 6/2016 | Takako | |
| 2016/0302463 A1 | 10/2016 | Woodyer | |
| 2017/0150731 A1 | 6/2017 | Berrocal | |

FOREIGN PATENT DOCUMENTS

| | | | | |
|---|---|---|---|---|
| JP | 2015-512268 A | 4/2015 | | |
| KR | 2009-0077072 A | 7/2009 | | |
| KR | 2016-0075467 A | 6/2016 | | |
| KR | 2016-0089551 A | 7/2016 | | |
| KR | 2016/0054997 A | 1/2017 | | |
| WO | 2012/010378 A1 | 1/2012 | | |
| WO | 2015075473 A1 | 5/2015 | | |
| WO | WO-2015075473 A1 * | 5/2015 | ........... A21D 13/062 | |
| WO | 2016/008742 A1 | 1/2016 | | |

OTHER PUBLICATIONS

Nagata et al., "Rare sugars, D-allulose, D-tagatose and D-sorbose, differently modulate lipid metabolism". Journal of the Science of Food and Agriculture, vol. 98, Issue 5, 2018; first published on Sep. 21, 2017. (Year: 2017).*

Yasuo Nagata et al., "D-Psicose, an epimer of D-fructose, favorably alters lipid metabolism in Sprague-Dawley rats", Journal of Agricultural and Food chemistry, 2015, 63, 3168-3176.

Masaru Ochiai et al., "Inhibition by Dietary D-Psicose of Body Fat Accumulation in Adult Rats Fed a High-Sucrose Diet", Bioscience, Biotechnology, and Biochemistry, 2013, 77(5), 1123-1126.

Han, Youngji et al., "D-Allulose supplementation normalized the body weight and fat-pad mass in diet-induced obese mice via the regulation of lipid metabolism under isocaloric fed condition", Molecular Nutrition & Food Research, 2016, 60, 1695-1706.

International Search Report for corresponding Patent Application No. PCT/KR2017/015495 dated Apr. 6, 2018.

Baek et al., "D-Psicose, a Sweet Monosaccharide, Ameliorate Hyperglycemia, and Dyslipidemia in C57BL/6J db/db Mice", Journal of Food Science, 2010, vol. 75, No. 2, pp. H49-H53, XP009511230.

Extended European Search Report for corresponding European Patent Application No. 17886619.0 dated Apr. 24, 2020.

Han, Youngji, "Effect of D-psicose on regulation of lipid and glucose metabolism with antioxidant profile in diet induced obese C57BL/6J mice", Thesis for the Degree of Master of Food science and Nutrition, the Graduate School of Kyungpook National University, 2015, 1-64.

Original and English Translation of Chinese Office Action issued for corresponding Chinese Application No. 201780080904.1, dated Dec. 31, 2021.

* cited by examiner

CREAMER COMPRISING VEGETABLE LIPIDS AND ALLULOSE

RELATED APPLICATION DATA

This application is a divisional of U.S. patent application Ser. No. 16/435,939 filed Jun. 10, 2019, which is a national phase of International Application No. PCT/KR2017/015495 filed Dec. 26, 2017, which claims priority of Korean Application No. 10-2016-0179488 filed Dec. 26, 2016, all of which are incorporated herein by reference.

TECHNICAL FIELD

The present application relates to creamer containing vegetable lipid and allulose.

BACKGROUND ART

Coffee or tea (e.g., green tea, black tea, oolong tea, etc.) have strong bitter and sour tastes and are thus often supplemented with milk cream having an animal fat content of about 10-20% to reduce the bitter and sour tastes. However, milk cream is high in price, and thus liquid or powder type creamer containing low-cost vegetable lipid is commercially available. Although coffee itself has almost no calories, general coffee mix products containing commercially available creamer have a fat content of about 3 g per 1 bag (about 12 g), which corresponds to 25 kcal.

Allulose (D-psicose) is a C-3 epimer of D-fructose, which is a natural saccharide present in very small amounts in commercial mixtures of D-glucose and D-fructose obtained from hydrolysis of sucrose or isomerization of D-glucose. This was recognized as a Generally Recognized As Safe (GRAS) material by the United States Department of Agriculture (USDA). Since allulose is not metabolized in the human body, it has almost no calories. Allulose has 70% of sweetness compared to sugar and thus can be used as a sweetener to replace sugar. Therefore, the development of allulose is being actively carried out. Recently, it has been reported that allulose affects lipid metabolism (Yasuo nagata et al., *J. Agric, Food Chem.* 2015, 63, 3168-3176), however, the effects of allulose in association with the decrease in absorption and excretion of vegetable lipid have not been reported.

As such, the present inventors have confirmed that allulose has the effect of excreting the vegetable lipid in creamer as feces thereby completing the present application.

DISCLOSURE OF THE INVENTION

Technical Problem

An aspect of the present application provides creamer containing vegetable lipid, casein, maltose, phosphates, and allulose.

Technical Solution

Hereinafter, the present application will be described in detail.

Respective descriptions and embodiments disclosed in the present application may also be applied to other descriptions and embodiments. That is, all combinations of various elements disclosed in the present application fall within the scope of the present invention. Further, the scope of the present invention is not limited by the specific description below.

In addition, those skilled in the art will recognize, or be able to ascertain using no more than routine experimentation, many equivalents to the specific embodiments in accordance with the present application described herein. It is also intended that such equivalents be included in the present application.

To achieve the objects of the present application, an aspect of the present application provides creamer containing vegetable lipid, casein, maltose, phosphates, and allulose.

As used herein, the term "casein" is a meaning which includes not only casein purified from milk, but also salts thereof (e.g., casein sodium).

In an embodiment, the phosphates of the present application may include all of the phosphates used in food, and specifically, may be potassium phosphate dibasic, calcium phosphate tribasic, potassium polyphosphate, or a combination thereof.

In an embodiment, the allulose of the present disclosure may be, but not limited to, one which is extracted directly from natural products, chemically synthesized, or produced by biological methods.

In an embodiment, the allulose to be contained in the creamer of the present application may be liquid or crystal allulose. Specifically, the allulose may be crystal allulose, and more specifically, the crystal allulose may have an allulose purity of 90-99.5%.

In addition, the creamer of the present application may be in the state of powder, and specifically, may have a water content of 0.5-5%.

In an embodiment, the creamer of the present application may be a coffee creamer or a tea creamer.

The vegetable lipid of the present application may be at least one selected from the group consisting of coconut oil, palm oil, hydrogenated coconut oil, and hydrogenated palm oil.

In the creamer of the present application, the allulose may be contained such that a dry solid content thereof is in an amount of 20-150 parts by weight relative to 100 parts by weight of the vegetable lipid. Specifically, the allulose may be contained such that a dry solid content thereof is in an amount of 20-100 parts by weight, 20-50 parts by weight, 20-40 parts by weight, 30-150 parts by weight, 30-100 parts by weight, 30-50 parts by weight, or 30-40 parts by weight relative to 100 parts by weight of the vegetable lipid.

In another embodiment, the vegetable lipid in the creamer of the present application may be contained in an amount of 20-50 parts by weight relative to 100 parts by weight of the creamer. Specifically, the vegetable lipid may be contained in an amount of 20-40 parts by weight, 30-50 parts by weight, or 30-40 parts by weight relative to 100 parts by weight of the creamer.

In addition, in the creamer of the present application, the allulose can promote the excretion of the vegetable lipid as feces. Specifically, the excretion may be a discharge of triglycerides, free fatty acids, or a combination thereof.

In an embodiment, the creamer of the present application may not comprise sugar.

In another embodiment, the creamer of the present application may further comprise food components (e.g., vitamins, electrolytes, flavoring agents, coloring agents, pectic acid and a salt thereof, alginic acid and a salt thereof, organic acids, pH adjusters, emulsifiers, stabilizers, preservatives, glycerin, carbonizing agents, etc.) in addition to the above-described components.

Still another aspect of the present application provides a method comprising a step of administering a creamer containing vegetable lipid, casein, maltose, and phosphate to a subject; and a step of administering allulose to the subject, before, after, or simultaneously with the administration of the step of administering the creamer to the subject, wherein the method promotes the excretion of the vegetable lipid administered to the subject as feces, in which the subject refers to a human or animal.

In an embodiment of the present application, the step of administering the allulose to a subject may be performed simultaneously with the step of administering the creamer to a subject.

In addition, the administration may be performed orally.

In the method of the present application, the explanations of vegetable lipid, casein, phosphates, allulose, creamer, and excretion are as described in previous aspects.

In still another aspect, the present application relates to a use of allulose for promoting the excretion of vegetable lipid of the creamer containing vegetable lipid, casein, maltose, and phosphates, as feces.

In the use of the present application, the explanations of the vegetable lipid, casein, phosphates, allulose, creamer, and excretion are as described in previous aspects.

Advantageous Effects

The present application provides creamer in which allulose is contained, and thus has an effect of significantly increasing the vegetable lipid contained in the creamer as feces. In this regard, the creamer of the present application has the effect of improving sensory properties of coffee or tea while reducing consumer concerns on excessive intake of lipid at the time of creamer intake.

BRIEF DESCRIPTION OF THE DRAWINGS

In FIG. 2, PRA represents "HFD+creamer+5% allulose (w/w)" and PR represents "creamer+HFD".

MODE FOR CARRYING OUT THE INVENTION

Figure 1:
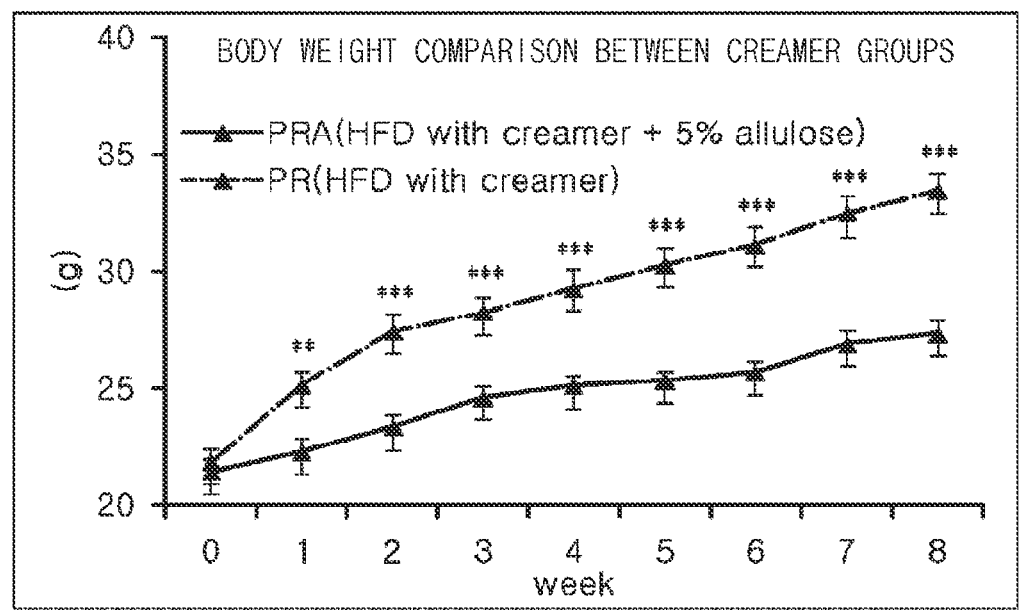
FIG. 1 is a graph illustrating the changes in body weight in C57BL/6J mice fed with creamer-containing high fat diet (HFD) together with allulose for 8 weeks, in which PR of the control group represents the provision of HFD together with creamer, and PRA represents the provision of HFD+creamer+5% allulose (w/w).

Hereinafter, the present application will be described in more detail to allow for a clearer understanding of the present application. However, the following examples are provided for easier understanding of the present application, and the present application is not limited to the following examples.

Experimental Methods

1. Breeding of Experimental Animals

16 C57BL/6J mice (male, 4-week-old) were purchased from the Jackson Laboratory (USA) and used. The mice were allowed to adapt to the breeding environment with the lab-chow diet (Purina Co., USA) for 4 weeks. Then, the mice were divided, by using the randomized block design, into a negative control group (PR: 8 mice), in which allulose was not fed, and an experimental group (PRA: 8 mice), in which allulose was fed, and the mice were fed with diet for 8 weeks.

For the diet of the negative control group, AIN-76 diet and HFD were applied, in which creamer ["Prima", Dongsuh Foods Corporation, Korea; raw materials: 30-38 wt % of hydrogenated vegetable lipid (hydrogenated coconut oil, hydrogenated palm oil), starch syrup (including maltose), sodium caseinate, potassium phosphate dibasic, calcium phosphate tribasic] was used as the vegetable lipid. For the diet of the experimental group, 5 wt % of sugar among the components of the diet of the negative control group were replaced with allulose (crystal allulose, 98 wt % or higher of allulose based on dry solid content, CJ Cheiljedang) and used (Table 1). All animal experiments were conducted with the approval of the Ethical Commission for Animal Experimentation, Kyungpook National University (Approval No.: KNU-2013-18).

TABLE 1

| Composition of experimental feeds (% of diet, w/w) | | |
|---|---|---|
| Groups | Negative Control Group (PR) | Experimental Group (PRA) |
| Casein | 20 | 20 |
| DL-Methionine | 0.3 | 0.3 |
| Corn starch | 11.1 | 11.1 |
| Sucrose | 37 | 32 |
| Cellulose | 5 | 5 |
| Creamer (Prima) | 14.6 | 14.6 |
| Lard | 5.4 | 5.4 |
| Mineral mix[1] | 4.2 | 4.2 |
| Vitamin mix[2] | 1.2 | 1.2 |
| Choline bitartrate | 0.2 | 0.2 |
| Cholesterol | 1 | 1 |
| tert-Butylhydroquinone | 0.004 | 0.004 |
| Allulose | — | 5 |
| Total (%) | 100 | 100 |
| kcal/g diet | 4.047 | 4.847 |

Note
[1] Mineral mix: AIN-76 mineral mixture (gram/kg): calcium phosphate, 500; sodium chloride, 74; potassium citrate, 2220; potassium sulfate, 52; magnesium oxide, 24; manganous carbonate, 3.5; ferric citrate, 6; zinc carbonate, 1.6; cupric carbonate, 0.3; potassium iodate, 0.01; sodium selenite, 0.01; chromium potassium sulfate, 0.55; sucrose 118.03

Note
[2] Vitamin mix: AIN-76 vitamin mixture (gram/kg): thiamin HCL, 0.6; riboflavin, 0.6; pyridoxine HCL, 0.7; nicotinic acid, 0.003; D-calcium pantothenate, 0.0016; folate, 0.2; D-biotin, 0.02; cyanocobalamin (vitamin B12), 0.001; retinyl palmitate premix, 0.8; DL-alpha tocopheryl acetate, premix, 20; cholecalciferol (vitamin D3), 0.0025; menaquinone (vitamin K), 0.05; antioxidant, 0.01; sucrose, finely powdered, 972.8

Pair feeding was performed based on the experimental group so as to feed the same level of iso-energetic diet, and thereby the effect of calorie reduction by allulose was excluded. The diet was refrigerated at 4° C. during the breeding period. The mice were bred in individual cages under constant temperature (25±2° C.), constant humidity (50±5%), and dark-light cycles at 12 hour intervals.

2. Measurement of Dietary Intake and Body Weight

Dietary intake was measured at constant time every day, and body weight was measured at constant time every week.

3. Collection and Analysis of Fecal Samples 3-1. Collection of Fecal Samples

The feces were collected for 84 hours (3.5 days) after termination of the breeding, dried, and stored frozen.

3-2. Extraction of Fecal Lipid

The neutral lipid, cholesterol, and free fatty acids in the feces were extracted by modifying/remedying the method of Folch et al. (1957). Specifically, the dried feces were ground in a mortar and 0.5 g was collected therefrom. 5 mL of a chloroform:methanol (2:1, v/v) solution was then added thereto and lipid were extracted at 4° C. for 24 hours. The extract was centrifuged at 3000×g at 4° C. for 10 minutes, and then 3 mL of the supernatant was collected, dried under nitrogen gas at 37° C., and dissolved again in 1 mL of the same extraction solvent.

Among them, 200 µL each were collected for the measurement of cholesterol and free fatty acids and dried again under nitrogen gas, and those for the measurement of neutral lipid and total cholesterol were dissolved in 500 µL of ethanol. Those for the measurement of free fatty acids were dissolved in 2.25 mL NaOH and the pH was adjusted to pH 2 to pH 3 by adding 1 M HCl solution thereto. At the time of quantification of total cholesterol and neutral lipid, 3 mM cholic acid (sodium salt) as an emulsifier and 0.5% Triton X-100 (for removal of turbidity that occurs at the time of color development) were mixed and used.

3-3. Quantification of Total Cholesterol in Feces

For the measurement of total cholesterol, 10 µL of the solution dissolved in ethanol (500 µL) and the emulsifier (690 µL) were mixed, and then 800 µL of a test solution (Asan Pharmaceutical kit) for measurement applying the enzyme method of Allain et al. (1974) was mixed. For quantification of both in forms of free cholesterol (FC) and cholesterol ester (CE), CE was converted to FC and fatty acid by cholesterol esterase. Among them, FC was reacted with cholesterol oxidase and converted to $\Delta^4$-cholestenone. The obtained product and $H_2O_2$ as a substrate were reacted with peroxidase, phenol, and 4-amino-antipyrine to obtain a red coloring material, and then the absorbance was measured at 500 nm. The measured value was quantified by comparing with the cholesterol standard curve.

3-4. Quantification of Neutral Lipid in Feces

For the measurement of neutral lipid, 10 µL of the solution dissolved in ethanol (500 µL) and the emulsifier (690 µL) were mixed, and then 800 µL of the test solution (Asan pharmaceutical kit) applying the enzyme method of McGowan et al. (1983) was mixed. Neutral lipid were decomposed by lipoprotein lipase (LPL) into glycerol and fatty acid. Among the decomposed products, glycerol forms L-α-glycerol phosphate by the action of ATP and glycerol kinase (GK), and this reacted with O2 and glycerophosphate oxidase (GPO) to generate $H_2O_2$. Then, peroxidase and 4-amino-antipyran were treated thereto so as to develop a red color, and the absorbance was measured at 550 nm and the measured value was quantified by comparing with the standard curve of glycerol.

3-5. Quantification of Free Fatty Acids in Feces

The concentration of free fatty acids was measured using a test solution for the measurement of free fatty acids (non-esterified fatty acid; NEFA kit, Wako, Japan) according to the principle of color development using the enzyme method. First, acyl coenzyme A synthase was acted on plasma free fatty acids and thereby producing acyl-CoA, AMP, and pyrophosphoric acid. Then, acyl coenzyme A oxidase was added thereto and thereby producing 2,3-trans-enolyl-CoA and $H_2O_2$. This was treated with peroxidase, 4-aminoantipyrine, and N-ethyl-N-(2-hydroxy-3-sulfopropyl)-m-toluidine to develop a red color, and then the absorbance was measured at 546 nm and the measured value was quantified by comparing with the standard curve of free fatty acids.

Results of Experiments

1. Confirmation of Inhibitory Effect Against Weight Gain by Allulose

At the time point of 0 week of the diet, the body weight of the negative control group (PR) and the experimental group (PRA) were at a similar level (Table 2). However, after 8 weeks of the diet, the body weight of the negative control group was significantly increased from week 1, whereas the body weight of the experimental group was significantly inhibited from the 1st week of the diet, and the significant inhibitory effect against weight gain in the experimental group was confirmed (Table 2 and FIG. 1).

TABLE 2

|  |  | Without allulose (PR) | With allulose (PRA) | p-value** (t-test) |
|---|---|---|---|---|
| Body weight | 0 week | 21.93 ± 0.46 | 21.47 ± 0.50 | 0.517 |
|  | 8th week | 33.50 ± 0.69 | 27.41 ± 0.48 | 0.000 |

Data represents mean ± SE.
**t-test represents the comparison of values between PR without allulose and PRA with 5 wt % allulose in each group.

2. Confirmation of Excretion Effect of Lipid in Creamer by Allulose

The effect of excretion of the lipid in creamer by allulose was confirmed by the amount of lipid excretion in the feces.

Figure 2:
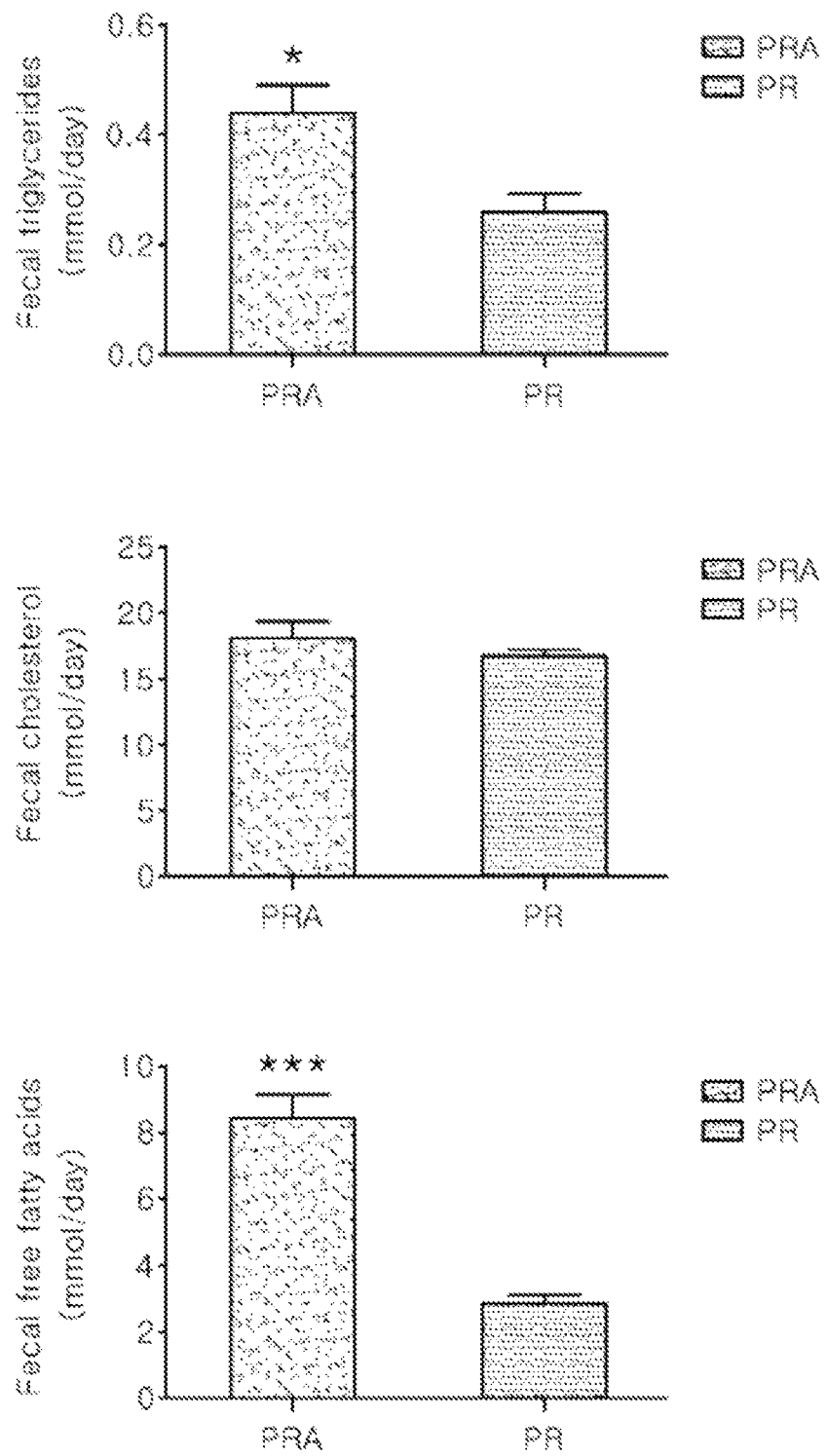
FIG. 2 is a graph illustrating the changes in the amount of fecal lipid excretion in C57BL/6J mice fed with creamer containing HFD together with allulose after 8 weeks, in which data represents mean±SE. The effective values between the group with no allulose and the group with allulose are as follows: *p<0.05, p<0.01, *p<0.001.

As a result, it was confirmed that the amounts of triglycerides and free fatty acids in the feces significantly increased in the experimental group compared to the negative control group. In particular, it was confirmed that the amount of free fatty acids was significantly higher than that of the negative control group (Table 3 and FIG. 2).

TABLE 3

|  | PRA | PR |
|---|---|---|
| Triglycerides (mmol/day) | 0.44 ± 0.053* | 0.26 ± 0.032 |
| Cholesterol (mmol/day) | 18.28 ± 0.97 | 16.81 ± 0.52 |
| Free Fatty Acids (mmol/day) | 8.39 ± 0.75*** | 2.78 ± 0.30 |

Data represents mean ± SE. A significant difference was shown between PR and PRA:
*p <0.05,
***p <0.001.
PRA, HFD + creamer +5% allulose; PR, HFD + creamer Accordingly, it was confirmed that when allulose was ingested along with the vegetable lipid in creamer, the excretion of lipid as feces was promoted.

It should be understood that the foregoing description of the present application is for illustrative purposes only and that those of ordinary skill in the art to which the present application pertains will be able to understand that the present application can easily be modified into other specific forms without altering the technical idea or essential features of the present application. Therefore, it should be understood that the embodiments described above are illustrative in all aspects and not restrictive.

The invention claimed is:

1. A method of promoting the excretion of vegetable lipid administered to a subject in need thereof as feces compris-ing:

administering creamer comprising vegetable lipid, casein, maltose, and phosphate to the subject, wherein the vegetable lipid is at least one selected from coconut oil, palm oil, hydrogenated coconut oil, and hydrogenated palm oil; and administering allulose to the subject, before, after, or simultaneously with the administration of the creamer to the subject; wherein the allulose is administered in an amount of 20-150 parts by weight relative to 100 parts by weight of the vegetable lipid based on a dry solid weight;

wherein the amount of triglycerides and free fatty acids increase more in the feces than that of a subject administered with the creamer but not administered with allulose.

2. The method of claim 1, wherein the allulose is crystal allulose.

3. The method of claim 1, wherein the creamer is in a powder state.

4. The method of claim 1, wherein the creamer has a water content of 0.5% to 5%.

5. The method of claim 1, wherein the creamer is a coffee creamer or a tea creamer.

6. The method of claim 1, wherein the vegetable lipid is contained in an amount of 20-50 parts by weight relative to 100 parts by weight of the creamer.

* * * * *

UNITED STATES PATENT AND TRADEMARK OFFICE
CERTIFICATE OF CORRECTION

PATENT NO. : 11,968,990 B2  
APPLICATION NO. : 17/653992  
DATED : April 30, 2024  
INVENTOR(S) : Young Mi Lee et al.

Page 1 of 1

It is certified that error appears in the above-identified patent and that said Letters Patent is hereby corrected as shown below:

On the Title Page

Column 1, at assignee Item (73): add the second assignee so the paragraph reads "CJ CHEILJEDANG CORPORATION, Seoul (KR); KYUNGPOOK NATIONAL UNIVERSITY INDUSTRY-ACADEMIC COOPERATION FOUNDATION, DAEGU (KR)"

Signed and Sealed this  
Twenty-fifth Day of June, 2024

Katherine Kelly Vidal  
*Director of the United States Patent and Trademark Office*